United States Patent
Wei et al.

(10) Patent No.: US 11,448,552 B2
(45) Date of Patent: Sep. 20, 2022

(54) COMMON-PATH CUBE CORNER INTERFEROMETER AND INTERFERENCE TECHNIQUE

(71) Applicant: XI'AN INSTITUTE OF OPTICS AND PRECISION MECHANICS, CHINESE ACADEMY OF SCIENCES, Shaanxi (CN)

(72) Inventors: Ruyi Wei, Shaanxi (CN); Lamei Di, Shaanxi (CN)

(73) Assignee: XI'AN INSTITUTE OF OPTICS AND PRECISION MECHANICS, CHINESE ACADEMY OF SCIENCES, Xi'an (CN)

( * ) Notice: Subject to any disclaimer, the term of this patent is extended or adjusted under 35 U.S.C. 154(b) by 0 days.

(21) Appl. No.: 17/240,950

(22) Filed: Apr. 26, 2021

(65) Prior Publication Data

US 2021/0333149 A1 Oct. 28, 2021

(30) Foreign Application Priority Data

Apr. 27, 2020 (CN) .......................... 202010344002.8

(51) Int. Cl.
*G01J 3/02* (2006.01)
*G01J 3/45* (2006.01)

(52) U.S. Cl.
CPC ........... *G01J 3/0208* (2013.01); *G01J 3/0243* (2013.01); *G01J 3/45* (2013.01)

(58) Field of Classification Search
CPC .......... G01J 3/45; G01J 3/0208; G01J 3/0243; G01J 3/4535; G01J 3/4532; G01J 3/4531
See application file for complete search history.

(56) References Cited

U.S. PATENT DOCUMENTS

| 6,469,790 B1 * | 10/2002 | Manning | G01J 3/0202 356/451 |
| 2006/0238769 A1 * | 10/2006 | Manning | G01J 3/453 356/455 |
| 2016/0066775 A1 * | 3/2016 | Hunter | G01J 3/1256 600/178 |

FOREIGN PATENT DOCUMENTS

| CN | 104713649 A | * | 6/2015 | |
| WO | WO-9611387 A1 | * | 4/1996 | ............ G01J 3/4532 |
| WO | WO-02065073 A1 | * | 8/2002 | ............ G01J 3/4532 |

* cited by examiner

*Primary Examiner* — Tarifur R Chowdhury
*Assistant Examiner* — Roberto Fabian, Jr.
(74) *Attorney, Agent, or Firm* — Brundidge & Stanger, P.C.

(57) ABSTRACT

The present disclosure relates to a common-path cube-corner retroreflector interferometer with a large optical path difference and high stability, and an interference technique thereof. The interferometer adopts an asymmetric common-path beam splitting structure using right-angled cube-corner retroreflectors, comprising a semi-transmissive and semi-reflective beam splitter, a plane mirror, a first right-angled cube-corner retroreflector, a second right-angled cube-corner retroreflector and an optical path difference element. The incident light is divided into a first transmitted beam and a second reflected beam, which are respectively reflected by the plane mirror and the right-angled cube-corner retroreflectors several times and then split again, two beams of which become interference outputs along directions perpendicular to an incident direction of the incident light, and the other two beams become interference outputs along directions parallel to the incident light. The present disclosure also provides an interference technique based on the interferometer described above.

16 Claims, 2 Drawing Sheets

COMMON-PATH CUBE CORNER INTERFEROMETER AND INTERFERENCE TECHNIQUE

CROSS REFERENCE TO RELATED APPLICATION(S)

This patent application claims the benefit and priority of Chinese Patent Application No. 202010344002.8, filed on Apr. 27, 2020, the disclosure of which is incorporated by reference herein in its entirety as part of the present application.

TECHNICAL FIELD

The present disclosure relates to a cube corner interferometer used in the spectrum measurement technology, and in particular to a common-path cube-corner retroreflector interferometer with a large optical path difference and high stability, and an interference technique thereof.

BACKGROUND ART

Interferometers utilize the superposition of waves to obtain phase information of waves, so as to obtain physical quantities of concern for experiments. Interferometers are widely used in precision measurement fields such as astronomy, optics, engineering surveying, oceanography, spectrum analysis, remote sensing, and radars.

Being an extremely sensitive component, even in almost vibration-free environments, an interferometer may have obvious jitters in interference fringes due to slight air disturbance or stress changes. Traditional interferometers include a non-common-path interferometer and a common-path interferometer. The non-common-path interferometer, such as the Michelson interferometer and the M-Z interferometer, is susceptible to disturbance from external thermodynamic deformation, resulting in the change of optical path difference and in turn the movement of interference fringes and the phase instability, thus leading to large instrument errors and inaccurate measurement. The common-path interferometer, such as Sagnac interferometers and point-diffraction interferometers, is generally superior to non-common-path interferometers in terms of environmental adaptability, and may obtain more stable interference fringes of higher contrast. The common-path interferometer can be used for surface detection of optical devices and acquisition of spectral image information, and can also be used as the core component of the gyroscope. Traditional common-path interferometers based on component amplitudes are mostly the Sagnac interferometer mainly consisting of a beam splitter and 2 to 3 plane mirrors, which enables two almost identical optical paths creating interference. Theoretically, since the changes of environmental pressure and temperature simultaneously act on two light beams split by the common-path interferometer, the resultant local thermodynamic deformation and the optical path difference error caused by the linear expansion of mechanical support will offset each other, so as to form very stable interference fringes. However, the position change of a reflective plane mirror in an optical element in the optical path due to environmental interference cannot be eliminated, which causes slight changes to the optical path and reduces the stability of the interferometer. In addition and generally, in the traditional interferometer, only one path is used as an interference outputs, so that the beam energy has a low utilization.

SUMMARY

The present disclosure aims at providing a common-path cube corner interferometer which overcomes defects that traditional Sagnac interferometers are easily interfered by external environments and have low utilization of beam energy. According to the present disclosure, a right-angled cube-corner retroreflector (also called a cube-corner prism) is used to replace a plane mirror in a traditional interferometer, so that the influence on stability due to the environmental interference is reduced, thus facilitating precise angle alignment. Moreover, the interferometer adopts an asymmetric common-path beam-splitting structure that enables a full use of two output interference light beams and greatly improves the energy utilization.

The technical scheme adopted in the present disclosure is a common-path cube corner interferometer, including a semi-transmissive and semi-reflective beam splitter, a plane mirror, a first right-angled cube-corner retroreflector, a second right-angled cube-corner retroreflector and an optical path difference element; wherein:

The semi-transmissive and semi-reflective beam splitter splits incident light into a first transmitted beam and a second reflected beam;

The plane mirror is vertically arranged relative to the semi-transmissive and semi-reflective beam splitter;

The first right-angled cube-corner retroreflector and the second right-angled cube-corner retroreflector are asymmetrically arranged at either side of the semi-transmissive and semi-reflective beam splitter, and a base plane of the first right-angled cube-corner retroreflector is parallel to an incident direction of the incident light, while a base plane of the second right-angled cube-corner retroreflector is perpendicular to the incident direction of the incident light; the base planes of the right-angled cube-corner retroreflectors are planes of incident light beams;

The first beam is sequentially reflected by the plane mirror, the first right-angled cube-corner retroreflector, the plane mirror, the second right-angled cube-corner retroreflector, the plane mirror, and then returns to the semi-transmissive and semi-reflective beam splitter for splitting into the first transmitted beam and the first reflected beam;

The second beam is sequentially reflected by the plane mirror, the second right-angled cube-corner retroreflector, the plane mirror, the first right-angled cube-corner retroreflector, the plane mirror, and then returns to the semi-transmissive and semi-reflective beam splitter for splitting into the second transmitted beam and the second reflected beam;

The first reflected beam and the second transmitted beam are parallel to the incident light;

The optical path difference element is arranged at a random position in an optical path where the second beam is reflected by and then returns to the semi-transmissive and semi-reflective beam splitter, or at a random position in an optical path where the first beam is transmitted by and then returns to the semi-transmissive and semi-reflective beam splitter, so that an optical path difference is generated between the first beam and the second beam.

Furthermore, in the above-mentioned asymmetric structure of the first right-angled cube-corner retroreflector and the second right-angled cube-corner retroreflector relative to the semi-transmissive and semi-reflective beam splitter, the first right-angled cube-corner retroreflector and the second right-angled cube-corner retroreflector are at different distances from the semi-transmissive and semi-reflective beam splitter.

Furthermore, in the above-mentioned asymmetric structure of the first right-angled cube-corner retroreflector and the second right-angled cube-corner retroreflector relative to the semi-transmissive and semi-reflective beam splitter, the first right-angled cube-corner retroreflector and the second right-angled cube-corner retroreflector are at different distances from the plane mirror.

Further, in the above-mentioned common-path cube-corner interferometer, for the purpose of flexible design of the optical system, the first right-angled cube-corner retroreflector and the second right-angled cube-corner retroreflector are both two-sided ones or three-sided ones.

Further, in order to effectively change the optical path difference, the optical path difference element consists of a prism or a combination of reflecting mirrors.

The present disclosure also provides an interference technique based on the above mentioned common-path cube-corner interferometer, wherein:

Incident light enters the common-path cube-corner interferometer in a form of parallel or converging light, so that an incident direction of the incident light is parallel to a base plane of a first right-angled cube-corner retroreflector and perpendicular to a base plane of a second right-angled cube-corner retroreflector;

The incident light is split by a semi-transmissive and semi-reflective beam splitter into a first transmitted beam and a second reflected beam;

The first beam, after being incident into a plane mirror firstly, is reflected to the first right-angled cube-corner retroreflector; it is then reflected by the first right-angled cube-corner retroreflector to the plane mirror for the second time; next, it is again reflected by the plane mirror to the second right-angled cube-corner retroreflector, and is reflected by the second right-angled cube-corner retroreflector to the plane mirror for the third time; and it is reflected by the plane mirror to the semi-transmissive and semi-reflective beam splitter;

The second beam, after being incident into a plane mirror firstly, is reflected to the second right-angled cube-corner retroreflector; it is then reflected by the second right-angled cube-corner retroreflector to the plane mirror for the second time; next, it is again reflected by the plane mirror to the first right-angled cube-corner retroreflector, and is reflected by the first right-angled cube-corner retroreflector to the plane mirror for the third time; and it is reflected by the plane mirror to the semi-transmissive and semi-reflective beam splitter;

The first beam passes through an optical path difference element before reaching the semi-transmissive and semi-reflective beam splitter, or the second beam passes through the optical path difference element before reaching the semi-transmissive and semi-reflective beam splitter; The first beam is split again by the semi-transmissive and semi-reflective beam splitter into a first transmitted beam and a first reflected beam; the second beam is split again by the semi-transmissive and semi-reflective beam splitter into a second transmitted beam and a second reflected beam;

The first transmitted beam and the second reflected beam are superimposed along a direction perpendicular to the incident direction of the incident light to form interference fringes; and the first reflected beam and the second transmitted beam are superposed along a direction parallel to the incident direction of the incident light to form interference fringes.

The present disclosure is beneficial in:

(1) The present disclosure adopts a common-path splitting technology wherein external thermodynamic deformation simultaneously acts on two light beams split by the interferometer, so that resultant optical path differences can be offset by each other so as to form more stable interference fringes; in addition, the present disclosure uses right-angled cube-corner retroreflectors instead of plane mirrors in traditional interferometers, which further reduces the influence on the stability due to environmental interference, develops good anti-vibration performance, and reduces the difficulty of optical path adjustment that the emergent light will be parallel to the incident light regardless of any angle of an incident light beam on the right-angled cube-corner retroreflectors, thus facilitating precise angle alignment and achieving nearly ideal optical performance;

(2) In the present disclosure, two interference light beams output by the common-path cube-corner interferometer with an asymmetric structure are all utilized in comparison with that only one path is utilized as an interference output in a traditional interferometer, so as to greatly improve the energy utilization and the system sensitivity as well;

(3) In the present disclosure, an element for altering an optical path, such as a prism or a combination of reflecting mirrors, is added to one of the two beams split from the incident light, so that a large optical path difference may be generated between the two beams;

(4) The optical system of the common-path cube-corner interferometer provided in the present disclosure is flexible in design, and has various forms of input light sources, such as a point light source or an area light source, a parallel light or a converging light; the right-angled cube-corner retroreflectors may be two-sided ones or three-sided ones, and the plane formed by the incident light split by the beam splitter and the plane formed by the emergent light split by the beam splitter may be in different planes.

Figure 1:
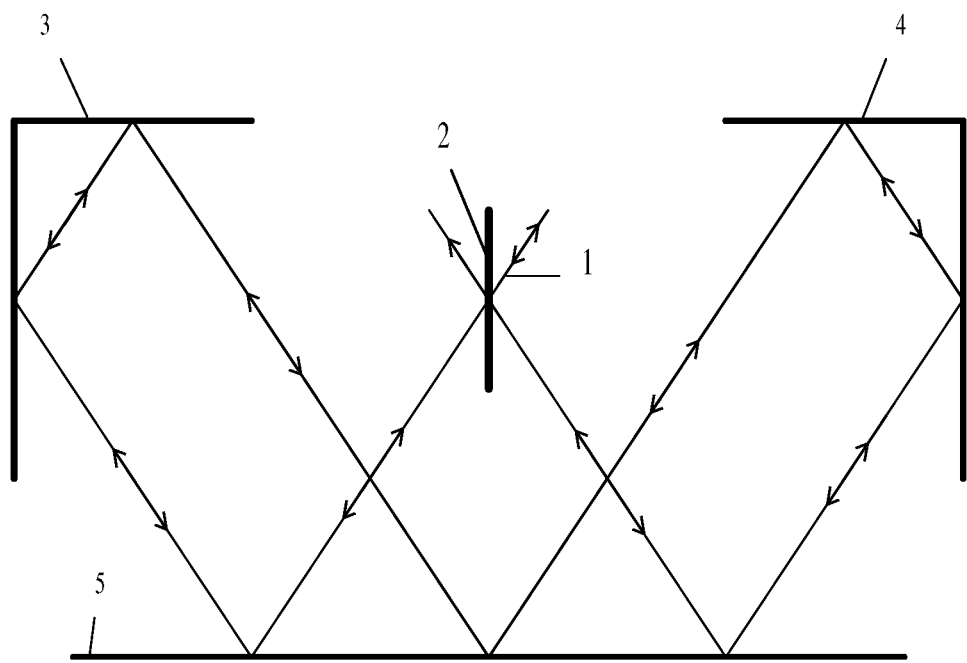
FIG. 1 is a schematic diagram of an optical path when right-angled cube-corner retroreflectors are used instead of plane mirrors according to the present disclosure.

Reference Numerals in the Drawings Include:

1 incident light, 2 semi-transmissive and semi-reflective beam splitter, 3 first right-angled cube-corner retroreflector, 4 second right-angled cube-corner retroreflector, 5 plane mirror, 6 optical path difference element.

DETAILED DESCRIPTION OF THE EMBODIMENTS

The present disclosure will be described in detail with reference to figures and specific embodiments below.

The present disclosure adopts an interference splitting technique by common-path right-angled cube-corner retroreflectors instead of traditional common-path Sagnac splitting technique, so to improve the stability of the interferometer system. Using right-angled cube-corner retroreflectors instead of traditional plane mirrors may develop good vibration immunity and reduce the difficulty of optical path adjustment. For a light beam incident on the right-angled cube-corner retroreflector, regardless of its incident angle, the geometric parallel can ensure between its incident direction and emergent direction, so as to enable precise angular alignment. In the schematic diagram of optical paths given in FIG. 1, incident light 1 is split by a semi-transmissive and semi-reflective beam splitter 2 into a transmitted beam and a reflected beam, and the two beams then achieve optical path transmission through optical elements such as a plane mirror 5, a first right-angled cube-corner retroreflector 3, and a second right-angled cube-corner retroreflector 4, and finally generate two emergent beams in a direction perpendicular to the incident direction of the incident light. In the present disclosure, the common-path design is improved to become an asymmetric structure, so that the returned beam (i.e., the beam returning to the incident direction of the incident light) is no longer overlapped with the incident beam, but spatially separated in parallel, so that two emergent beams parallel to the incident direction of the incident light may also be utilized so as to improve the utilization of the light beams. In addition, the optical path is changed by ways of changing the beam medium or changing the beam path. For example, if one of the two split beams is added into an optical device (optical path difference element) that changes the optical path, this beam may have a change at the optical path, resulting in an optical path difference with the other beam.

Figure 2:
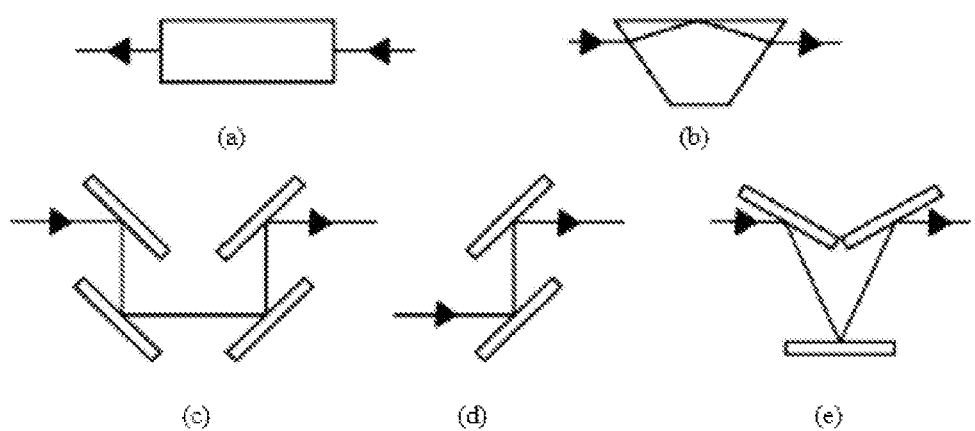
FIG. 2 is a schematic diagram of changing optical paths by using several optical path difference elements provided in the present disclosure, in which (a) is a square prism, (b) is a trapezoidal prism, and (c), (d) and (e) are all combinations of plane mirrors.

FIG. 2 gives the schematic diagram of changing the optical path by the optical path difference element, and lists several combinations of prisms and several reflecting mirrors, wherein (a) is a square prism for which the optical path is changed by means of passing the beam through a prism medium; (b) is a trapezoidal prism for which the optical path is changed by two ways: passing the beam through a prism medium and lengthening the propagation path of the beam in the prism; (c), (d) and (e) are all plane mirror combinations for which the optical paths are changed by extending the beam propagation paths through multiple reflections in the mirror combinations.

Embodiment 1

Figure 3:
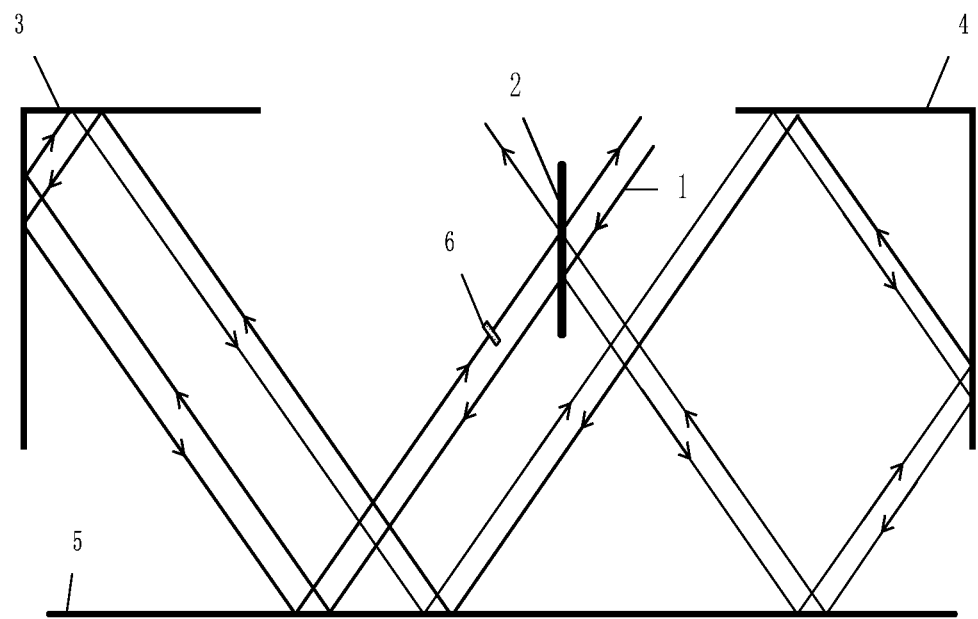
FIG. 3 is a schematic diagram of optical paths of the common-path cube-corner interferometer according to Embodiment 1 of the present disclosure.

In this embodiment, the common-path cube-corner interferometer as shown in FIG. 3 adopts an asymmetric common-path beam splitting structure having right-angled cube-corner retroreflectors with a large optical path difference, including a semi-transmissive and semi-reflective beam splitter 2, a first right-angled cube-corner retroreflector 3, a second right-angled cube-corner retroreflector 4, a plane mirror 5, an optical path difference element 6. In this embodiment, a prism is selected as the optical path difference element 6, and the right-angled cube-corner retroreflectors are all two-sided ones.

The asymmetric structure of the common-path cube-corner interferometer in this embodiment is embodied in that the first right-angled cube-corner retroreflector 3 and the second right-angled cube-corner retroreflector 4 are at different distances from the semi-transmissive and semi-reflective beam splitter 2.

Incident light 1 enters the common-path cube-corner interferometer in a form of parallel or converging light, with a work flow as follows:

The incident light (1) is split by the semi-transmissive and semi-reflective beam splitter (2) into a first transmitted beam and a second reflected beam;

The first beam, after being incident into a plane mirror 5 firstly, is reflected to the first right-angled cube-corner retroreflector 3; it is then reflected by the first right-angled cube-corner retroreflector 3 to the plane mirror 5 for the second time; next, it is again reflected by the plane mirror 5 to the second right-angled cube-corner retroreflector 4, and is reflected by the second right-angled cube-corner retroreflector 4 to the plane mirror 5 for the third time; and it is reflected by the plane mirror 5 to the semi-transmissive and semi-reflective beam splitter 2;

The second beam, after being incident into a plane mirror 5 firstly, is reflected to the second right-angled cube-corner retroreflector 4; it is then reflected by the second right-angled cube-corner retroreflector 4 to the plane mirror 5 for the second time; next, it is again reflected by the plane mirror 5 to the first right-angled cube-corner retroreflector 3, and is reflected by the first right-angled cube-corner retroreflector 3 to the plane mirror 5 for the third time; and it then passes through the prism (optical path difference element 6) to reach the semi-transmissive and semi-reflective beam splitter 2;

The first beam is split again by the semi-transmissive and semi-reflective beam splitter 2 into a first transmitted beam and a first reflected beam; the second beam is split again by the semi-transmissive and semi-reflective beam splitter 2 into a second transmitted beam and a second reflected beam;

The first transmitted beam and the second reflected beam are superimposed along a direction perpendicular to the incident direction of the incident light to form interference fringes; and the first reflected beam and the second transmitted beam are superposed along a direction parallel to the incident direction of the incident light to form interference fringes.

In other embodiments, other types of prisms or plane mirror combinations may also be selected for the optical path difference element 6. The optical path difference element 6 can be placed on any optical path before the transmitted beam reaches the semi-transmissive and semi-reflective beam splitter 2 again to change the optical path of the reflected beam, or it can be placed on any optical path before the reflected beam reaches the semi-transmissive and semi-reflective beam splitter 2 again to change the optical path of the reflected beam.

In other embodiments, the right-angled cube-corner retroreflectors may also be three-sided ones.

Embodiment 2

Figure 4:
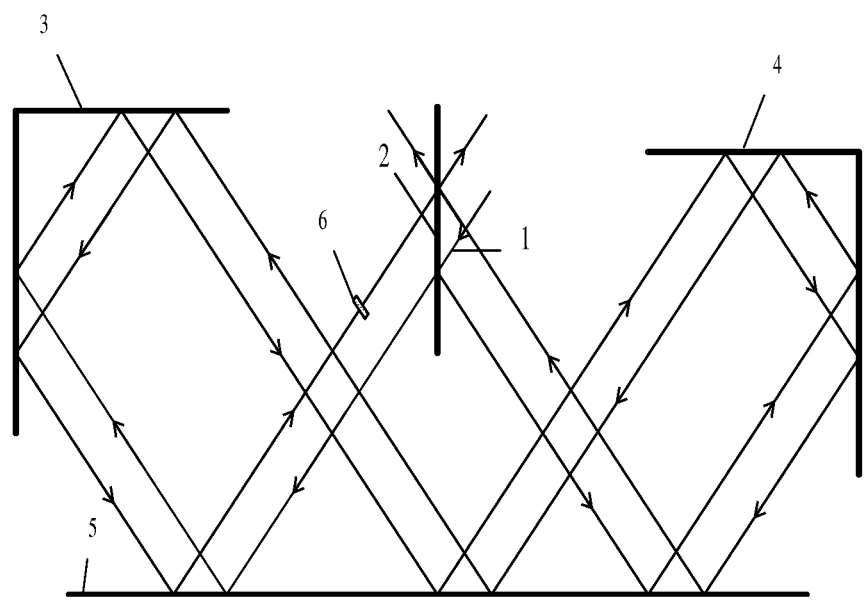
FIG. 4 is a schematic diagram of optical paths of the common-path cube-corner interferometer according to Embodiment 2 of the present disclosure.

As shown in FIG. 4, a difference between this Embodiment 2 and the above-mentioned Embodiment 1 is that: the asymmetric structure of the common-path cube-corner interferometer is embodied in that the first right-angled cube-corner retroreflector 3 and the second right-angled cube-corner retroreflector 4 are at different distances from the plane mirror 2.

What is claimed is:
1. A common-path cube corner interferometer, comprising:
a semi-transmissive and semi-reflective beam splitter, a plane mirror, a first right-angled cube-corner retroreflector, a second right-angled cube-corner retroreflector and an optical path difference element; wherein:
the semi-transmissive and semi-reflective beam splitter splits incident light into a transmitted beam and a reflected beam;
the plane mirror is vertically arranged relative to the semi-transmissive and semi-reflective beam splitter;

the first right-angled cube-corner retroreflector and the second right-angled cube-corner retroreflector are asymmetrically arranged at either side of the semi-transmissive and semi-reflective beam splitter, and a base plane of the first right-angled cube-corner retroreflector is parallel to an incident direction of the incident light, while a base plane of the second right-angled cube-corner retroreflector is perpendicular to the incident direction of the incident light;

the transmitted beam is sequentially reflected by the plane mirror, the first right-angled cube-corner retroreflector, the plane mirror, the second right-angled cube-corner retroreflector, the plane mirror, and then returns to the semi-transmissive and semi-reflective beam splitter for splitting into a first transmitted beam and a first reflected beam;

the reflected beam is sequentially reflected by the plane mirror, the second right-angled cube-corner retroreflector, the plane mirror, the first right-angled cube-corner retroreflector, the plane mirror, and then returns to the semi-transmissive and semi-reflective beam splitter for splitting into a second reflected beam and a second transmitted beam;

the first reflected beam and the second transmitted beam are parallel to the incident light; and the optical path difference element is arranged at a random position in an optical path where the reflected beam is reflected by and then returns to the semi-transmissive and semi-reflective beam splitter, or at a random position in an optical path where the transmitted beam is transmitted by and then returns to the semi-transmissive and semi-reflective beam splitter, so that an optical path difference is generated between the transmitted beam and the reflected beam.

2. The common-path cube corner interferometer according to claim 1, wherein the first right-angled cube-corner retroreflector and the second right-angled cube-corner retroreflector are at different distances from the semi-transmissive and semi-reflective beam splitter.

3. The common-path cube corner interferometer according to claim 2, wherein the first right-angled cube-corner retroreflector and the second right-angled cube-corner retroreflector are at different distances from the plane mirror.

4. The common-path cube corner interferometer according to claim 2, wherein the first right-angled cube-corner retroreflector and the second right-angled cube-corner retroreflector are both two-sided right-angled cube-corner retroreflectors or three-sided right-angled cube-corner retroreflectors.

5. The common-path cube corner interferometer according to claim 1, wherein the first right-angled cube-corner retroreflector and the second right-angled cube-corner retroreflector at different distances from the plane mirror.

6. The common-path cube corner interferometer according to claim 1, wherein the first right-angled cube-corner retroreflector 3) and the second right-angled cube-corner retroreflector are both two-sided right-angled cube-corner retroreflectors or three-sided right-angled cube-corner retroreflectors.

7. The common-path cube corner interferometer according to claim 6, wherein the optical path difference element consists of a prism or a combination of reflecting mirrors.

8. An interference technique based on the common-path cube-corner interferometer according to claim 1, wherein:

incident light enters the common-path cube-corner interferometer in a form of parallel or converging light, so that an incident direction of the incident light is parallel to the base plane of the first right-angled cube-corner retroreflector and perpendicular to the base plane of the second right-angled cube-corner retroreflector;

the incident light is split by a semi-transmissive and semi-reflective beam splitter into the transmitted beam and the reflected beam;

the transmitted beam, after being incident into the plane mirror firstly, is reflected to the first right-angled cube-corner retroreflector; the transmitted beam is then reflected by the first right-angled cube-corner retroreflector to the plane mirror for the second time; next, the transmitted beam is again reflected by the plane mirror to the second right-angled cube-corner retroreflector, and the transmitted beam is reflected by the second right-angled cube-corner retroreflector to the plane mirror for the third time; and the transmitted beam is reflected by the plane mirror to the semi-transmissive and semi-reflective beam splitter;

the reflected beam, after being incident into the plane mirror firstly, is reflected to the second right-angled cube-corner retroreflector; the reflected beam is then reflected by the second right-angled cube-corner retroreflector to the plane mirror for the second time; next, the reflected beam is again reflected by the plane mirror to the first right-angled cube-corner retroreflector, and the reflected beam is reflected by the first right-angled cube-corner retroreflector to the plane mirror for the third time; and the reflected beam is reflected by the plane mirror to the semi-transmissive and semi-reflective beam splitter;

the transmitted beam passes through the optical path difference element before reaching the semi-transmissive and semi-reflective beam splitter, or the reflected beam passes through the optical path difference element before reaching the semi-transmissive and semi-reflective beam splitter;

the transmitted beam is split again by the semi-transmissive and semi-reflective beam splitter into the first transmitted beam and the first reflected beam; the reflected beam is split again by the semi-transmissive and semi-reflective beam splitter into the second transmitted beam and the second reflected beam; and the first transmitted beam and the second reflected beam are superimposed along a direction perpendicular to the incident direction of the incident light to form interference fringes;

and the first reflected beam and the second transmitted beam are superposed along a direction parallel to the incident direction of the incident light to form interference fringes.

9. The common-path cube corner interferometer according to claim 8, wherein the optical path difference element consists of a prism or a combination of reflecting mirrors.

10. The interference technique according to claim 1, wherein the first right-angled cube-corner retroreflector and the second right-angled cube-corner retroreflector are at different distances from the semi-transmissive and semi-reflective beam splitter.

11. The common-path cube corner interferometer according to claim 10, wherein the first right-angled cube-corner retroreflector and the second right-angled cube-corner retroreflector are at different distances from the plane mirror.

12. The common-path cube corner interferometer according to claim 10, wherein the first right-angled cube-corner retroreflector and the second right-angled cube-corner retroreflector are both two-sided right-angled cube-corner retroreflectors or three-sided right-angled cube-corner retroreflectors.

13. The common-path cube corner interferometer according to claim 12, wherein the optical path difference element consists of a prism or a combination of reflecting mirrors.

14. The common-path cube corner interferometer according to claim 1, wherein the first right-angled cube-corner retroreflector and the second right-angled cube-corner retroreflector are at different distances from the plane mirror.

15. The common-path cube corner interferometer according to claim 1, wherein the first right-angled cube-corner retroreflector and the second right-angled cube-corner retroreflector are both two-sided right-angled cube-corner retroreflectors or three-sided right-angled cube-corner retroreflectors.

16. The common-path cube corner interferometer according to claim 15, wherein the optical path difference element consists of a prism or a combination of reflecting mirrors.

\* \* \* \* \*